US007114516B2

(12) United States Patent
Ito (10) Patent No.: US 7,114,516 B2
(45) Date of Patent: Oct. 3, 2006

(54) LEAK-DETECTING CHECK VALVE, AND LEAK-DETECTION ALARM SYSTEM THAT USES SAID CHECK VALVE

(75) Inventor: Nobuo Ito, Tokyo (JP)

(73) Assignee: Takasago Engineering Co., Ltd., Tokyo (JP)

( * ) Notice: Subject to any disclaimer, the term of this patent is extended or adjusted under 35 U.S.C. 154(b) by 357 days.

(21) Appl. No.: 10/683,264

(22) Filed: Oct. 14, 2003

(65) Prior Publication Data

US 2005/0087234 A1 Apr. 28, 2005

(51) Int. Cl.
*F16K 37/00* (2006.01)

(52) U.S. Cl. .............................. 137/487.5; 137/512.2; 137/554; 137/624.11; 73/40.5 R (58) Field of Classification Search ............ 137/487.5, 137/512.2, 554, 624.11; 73/40.5 R
See application file for complete search history.

(56) References Cited

U.S. PATENT DOCUMENTS

| | | | | | |
|---|---|---|---|---|---|
| 1,677,357 | A | * | 7/1928 | McGregor | 137/512.2 |
| 3,896,850 | A | * | 7/1975 | Waltrip | 137/554 |
| 3,916,946 | A | * | 11/1975 | Motzer | 137/512.2 |
| 4,148,339 | A | * | 4/1979 | Waltrip | 137/554 |
| 4,180,088 | A | * | 12/1979 | Mallett | 137/487.5 |
| 4,249,565 | A | * | 2/1981 | Brust | 137/624.11 |
| 4,589,435 | A | * | 5/1986 | Aldrich | 137/624.11 |
| 4,911,200 | A | * | 3/1990 | Ben-Arie | 137/487.5 |
| 5,004,014 | A | * | 4/1991 | Bender | 137/487.5 |
| 5,568,825 | A | * | 10/1996 | Faulk | 137/624.11 |
| 5,650,564 | A | * | 7/1997 | Wodeslavsky et al. | 73/40.5 R |
| 6,216,727 | B1 | * | 4/2001 | Genova et al. | 137/487.5 |

FOREIGN PATENT DOCUMENTS

JP 57-101176 * 6/1982 ............... 137/512.2

* cited by examiner

*Primary Examiner*—John Rivell
(74) *Attorney, Agent, or Firm*—Lowe Hauptman & Berner LLP.

(57) ABSTRACT

One object of the present invention is to monitor water pipes regularly and to detect water leaks by using basic equipment and to provide a device that generates an alarm when a leak occurs. The present invention responds not only to minor leaks that occur naturally because, for instance, a water pipe is decrepit, but also responds to human-caused leaks, such as those that occur because a person forgets to turn off a water faucet or because of the failure of equipment such as a hot-water heater. The present invention is a leak-detection alarm system that is composed of two main parts: (1) a leak-detecting check valve that detects movements of a movable device that makes the same movement as the valve element of a check valve that is attached to a water pipe and performs switching, and that transmits as detection signals the movement of valve elements, and (2) a signal-processing device that analyzes detection signals transmitted by the leak-detecting check valve and actuates a leak-detection alarm. The leak-detecting check valve has a main valve and an ancillary valve. The main valve operates in response to a high rate of flow of fluid through the pipe, such as occurs when there is a large leak that corresponds to said human-cause leaks, and the ancillary valve operates in response to low rate of flow of fluid through a pipe, such as occurs when there is a small leak that occurs naturally.

7 Claims, 6 Drawing Sheets

LEAK-DETECTING CHECK VALVE, AND LEAK-DETECTION ALARM SYSTEM THAT USES SAID CHECK VALVE

BACKGROUND OF THE INVENTION

This invention relates to a leak-detecting check valve and a leak-detection alarm system. More particularly, the leak-detecting check valve has a function of detecting the movement of a valve element of said leak-detecting check valve when said check valve is attached to a water pipe or other conduit for water. In addition, the leak-detection alarm system includes said leak-detecting check valve and a signal-processing device that receives leak-detection signals from said leak-detecting check valve, analyzes said signals, and actuates an alarm that indicates that a leak has been detected.

A leaking water pipe in a building not only increases water costs needlessly, but also, depending on the location and degree of the leak, can cause damage to the building and property therein, and can cause various problems for inhabitants of the building. In particular, in a residential complex such as a condominium building or hotel, there is the danger that a single leak in an upper floor will cause great damage to many units and rooms on lower floors; there are quite a few cases of such damage. Therefore, in a residential complex, where damage can spread easily and where there is relatively little communication among residents, and in a hotel, where the lodgers usually are temporary and constantly changing, checking for water leaks should be done regularly. And if a leak is detected, it is necessary to promptly take responsive action, such as by alerting the manager and each resident or lodger, so as to prevent water damage from spreading.

There are two types of leaks that damage buildings and chattels. The first type is generally a small leak that occurs naturally because a decrepit water pipe suddenly breaks or develops a hole in it. The second type is a human-caused leak such as one that results because someone forgets to close a faucet, which causes a sink or tub to overflow, or is a leak that results because of a breakdown or operational error of equipment that uses tap water. In order to prevent a leak from causing damage, regardless of which type of leak it is, it must be detected soon after it occurs and it must actuate an alarm.

Some methods of full-time monitoring of a building to detect a leak therein have already been known. There is, for example, a method that measures acoustic vibrations transmitted through a water pipe and thereby detects leaks (See Patent Document 1). Another example is a method that detects a leak by using supersonic waves (see Patent Document 2). However, both of those methods require a large device, and if a leak is not a large one, they cannot detect it. Also, those methods cannot be used to detect human-caused leaks such as might result from forgetting to close a faucet.

Another example is a check valve that is capable of detecting the flow volume of a fluid through a pipe by measuring the magnetism of a magnet installed on said check valve by using a plurality of magnetism detectors installed on a valve casing that opposes said magnet—i.e., measuring the distance that a valve of said check valve moves in proportion to the rate of flow of the fluid that passes through said check valve (see Patent Document 3).

Another leak-detection method is one that detects pulsed signals by a sensor installed on a rotary flowmeter, collecting and analyzing the signals' data to determine if there is a leak (see Patent Document 4). One object of such an invention is to detect only naturally occurring (i.e., not directly caused by human action) minor leaks, and therefore such an invention determines the existence of a leak by comparing the flow of water when there is no leak in the water pipe with the flow of water when the water system is not in use. As such, it cannot respond to leaks caused by human actions.

[Patent Document 1] Unexamined Patent Publication 2002-122502 Gazette

[Patent Document 2] Unexamined Patent Publication 2002-131170 Gazette

[Patent Document 3] Unexamined Patent Publication 2000-205447 Gazette

[Patent Document 4] Unexamined Patent Publication 2002-055019 Gazette.

SUMMARY OF THE INVENTION

The present invention detects leaks, but does so with a different principle and purpose from the publicly-known technology. This invention includes (1) a leak-detecting check valve that is equipped with a sensor that detects the location of a movable device that moves in accordance with the movements of two check valves—a main valve and an ancillary valve—that are installed on a water pipe, and (2) an alarm system that is equipped with a signal-processing device that (a) receives signals from a sensor contained in said leak-detecting check valve, (b) analyzes said signals, and (c) actuates an alarm when a leak is detected.

To achieve the above object, the leak-detecting check valve of the present invention is characterized by being equipped with (1) a valve casing that sets the circumference of the channel, (2) a main-valve sheet that is installed inside said valve casing, (3) a main valve that (a) has a wide fluid-channel opening, (b) is equipped at its center with an ancillary-valve sheet, and (c) is elastically energized toward the water-inlet side of said fluid channel and against said main-valve sheet by a main-valve spring, (4) an ancillary valve that has a narrow fluid-channel opening, and that is elastically energized toward the water-inlet side of said fluid channel and against said ancillary-valve sheet by an ancillary-valve spring, (5) a movable device that (a) is installed nearer to the water-outlet side of said fluid channel than are said main and ancillary valves, and (b) moves in said fluid channel in conjunction with said main and ancillary valves' movement toward the water-outlet side of said fluid channel, and (6) a sensor that is implanted inside a valve casing on the water-outlet side of the fluid channel such that said sensor faces the fluid channel, so that said sensor (a) senses said movable device when it moves to a specified location, thereby entering an area where sensing is possible, and (b) transmits valve-movement-detection signals.

As the preferred embodiment of this invention, it is preferable (1) that said valve casing be composed of (a) a water-inlet side casing member that is linked to the water-inlet side of the pipe, and that is equipped with said main-valve sheet, and (b) an water-outlet side casing member that (i) is linked to the water-outlet side of the pipe, (ii) stores said main valve, said ancillary valve, and said movable device, and (iii) is equipped with said sensor, which is installed so as to face said fluid channel; (2) that both casing members are linked to each other, and (3) that said ancillary valve sheet spring is constituted such that it elastically energizes an ancillary valve sheet—via said movable device—against the water-outlet side of the fluid channel.

Moreover, in the preferred embodiment of this invention, said sensor consists of a proximity switch that performs switching as said movable device approaches the sensor.

In addition, the leak-detection alarm system of the present invention is a system that uses said leak-detecting check valve and that is equipped with a signal-processing device that processes detection signals from said sensor in said leak-detecting check valve. The signal-processing device is equipped with (1) a first discriminate circuit, which detects the opening/closing of the main valve or ancillary valve, and (2) a second discriminate circuit, which measures the duration of the opening/closing of the main valve or ancillary valve, generating leak-detection alarm signals that result from the functioning of said discriminate circuits.

In the preferred embodiment, said leak-detection alarm system is constituted such that said leak-detection alarm signals actuate said alarm system, and such that said leak-detection alarm system is also equipped with a control device that opens/closes a main switching valve that is located upstream of said leak-detecting check valve.

Therefore, this invention offers a device that gives an alarm signal when a water leak is detected, thereby making it possible to prevent leak-caused damage from spreading, and that, more particularly, can respond not only to leaks that occur naturally due to a decrepit water pipe and the like but also can respond to leaks caused by human actions, such as forgetting to close a faucet, as well as to leaks caused by a breakdown or operational error of equipment—such as a hot-water supply apparatus—that uses tap water.

The valves of the leak-detecting check valve of the present invention are a main valve and an ancillary valve. Only the ancillary valve opens in response to a very small amount of flow of fluid, and only the main valve opens in response to a very large amount of flow of fluid. Thus, the present invention can sensitively respond to a very small amount of flow of fluid. Also, the opening/closing of these valves can be detected by (sensing) the movement of said movable device that moves in accordance with the movement of said valves. The alarm system of the present invention is equipped with a signal processing-device that transmits alarm signals under a specified condition, after comparing the opening/closing signals that are emitted from the leak-detection check valve with a signal value that has been predetermined as indicating a leak. Therefore, this alarm system can transmit an alarm not only in response to a leak that occurs naturally because of a decrepit water pipe and so on, but also in response to a leak that occurs because of an operating error or failure of equipment such as a hot-water heater. It also can determine whether the size of a leak is small or large before giving an alarm.

EXPLANATION OF NUMBERS IN THE DRAWINGS

1 Leak-detecting check valve
4 Valve casing
5 Main-valve sheet
6 Main valve
7 Main-valve spring
8 Ancillary-valve sheet
9 Ancillary valve
10 Ancillary-valve spring
14 Movable device
16 Water-outlet side casing member
17 Sensor
18 Water-inlet side casing member
24 Leak-detection alarm system
29 Leak-detecting check valve
30 Signal-processing device
31 Alarm-signal device.

DESCRIPTIONS OF THE PREFERRED EMBODIMENTS

Following are detailed descriptions of the preferred embodiments, with reference to the drawings.

Figure 1:
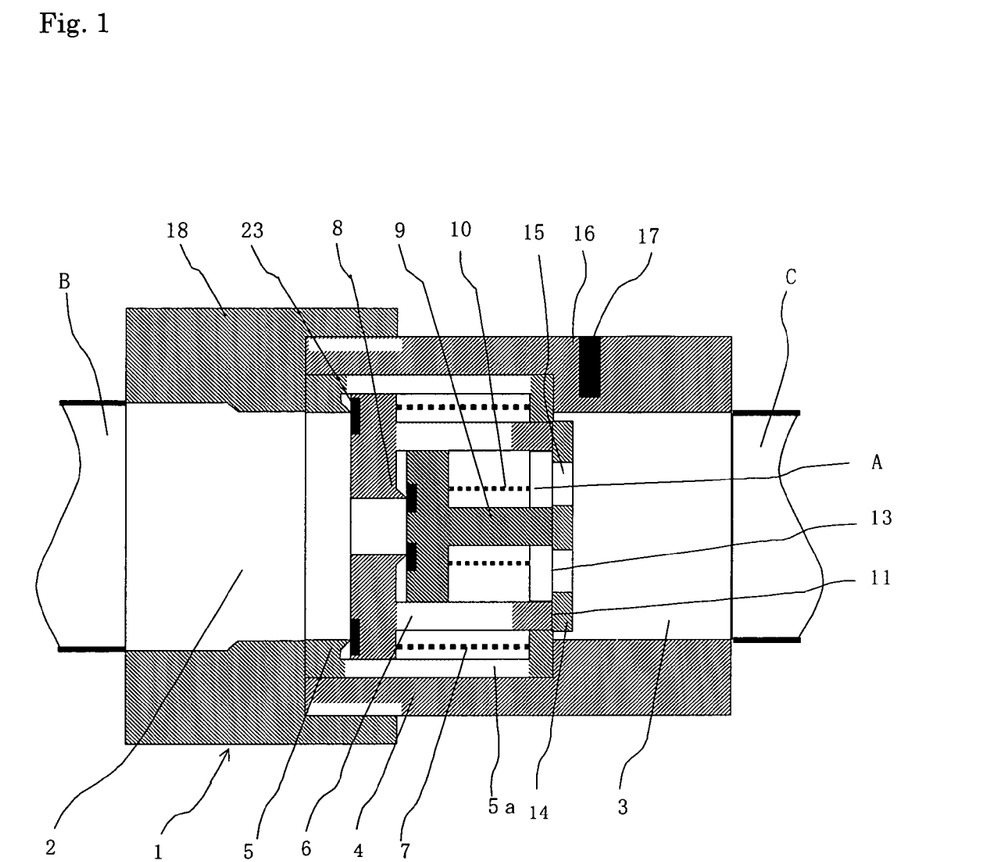
FIG. 1 is a cross-sectional view showing the leak-detection check valve of the present invention when there is no flow of a fluid.

FIG. 1 is a cross-sectional view of the leak-detecting check valve, illustrating the situation when the valve is closed and fluid is not moving. The leak-detecting check valve is characterized by having a main valve and an ancillary valve, and also being equipped with (1) a movable device that moves in conjunction with the movement of either of said main valve or said ancillary valve, and (2) a sensor that senses said movable device when said movable device moves to a specified location.

A detailed description of this embodiment will now be given.

The leak-detecting check valve 1 consists of (1) a valve casing 4, which sets the circumference of a cylindrically shaped fluid channel A; (2) a main-valve sheet 5 that is installed detachably inside said valve casing 4; (3) a main valve 6 that (a) has a wide fluid-channel opening, (b) is equipped at its center with an ancillary-valve sheet 8, and (c) is elastically energized toward the water-inlet side 2 of the fluid channel A and against the main-valve sheet 5 by the main-valve spring 7; (4) an ancillary valve 9 that has a narrow fluid-channel opening, and that is elastically energized toward the water-inlet side 2 of the fluid channel A and against said ancillary-valve sheet 8 by an ancillary-valve spring 10; (5) a movable device 14 that (a) is installed nearer to the water-outlet side of the fluid channel A than is the main valve 6 or the ancillary valve 9, and (b) moves in the fluid channel A in conjunction with the movement of said main valve 6 or said ancillary valve 9 toward the water-outlet side 3 of the fluid channel A, and (6) a sensor 17 that is implanted inside a valve casing 4 on the water-outlet side 3 of the fluid channel A such that said sensor 17 faces the fluid channel A, so that said sensor 17 (a) senses said movable device 14 when said movable device 14 moves to a specified location and enters an area where sensing is possible, and (b) transmits valve-movement-detection signals.

In addition, in this embodiment of the invention, packing 23, shaped in a roll and made of material such as hard rubber, is implanted in both the main valve 6 and the ancillary valve 9, which is at an adjacent area of the main valve sheet 5 and the ancillary valve sheet 8. In addition, said movable device 14 is firmly and integrally affixed to said ancillary valve 9.

In addition, the main-valve sheet 5 is formed so as to include a frame 5a, which keeps the main valve 6 and ancillary valve 9 inside said frame, and an air space that can secure an opening area that is large enough to cope with a large amount of flow from the main valve 6 when the main valve 6 opens, is formed in the frame 5a.

In this embodiment, the valve casing 4 is composed of (a) a water-inlet side casing member 18 that is connected to the water-inlet side pipe B, and (b) a water-outlet side casing member 16 that (i) is connected to the water-outlet side pipe C, (ii) stores said frame 5a and said movable device 14, and (iii) is equipped with a sensor 17 that is installed such that said sensor 17 faces the fluid channel A Both casing members 16 and 18 are connected with each other by such means as being screwed together. In addition, said ancillary-valve spring 10 is constituted such that it elastically energizes a movable device 14—via the ancillary valve 9—against the water-outlet side 13 of the frame 5a toward the water-outlet side 2 of the leak-detection check valve.

Further, in this embodiment, said movable device 14 has the shape of a circular plate, and it is (1) vertical to the cylindrical fluid channel A, (2) equipped with a fluid channel of the movable device 14, and (3) made of metal, such as stainless steel, aluminum, or a copper alloy. A sensor 17, which is a normal proximity switch that performs switching when detecting an impedance change caused by the approach of the metal movable device 14, is implanted inside the water-outlet side casing member 16. With regard to (a) the shape and material of the movable device 14, and (b) the proximity switch that detects said movable device, various combinations are possible, and they are not limited to the types described in connection with this embodiment. It is also possible (i) to implant a magnet inside the outer periphery of this movable device 14, and (ii) to use a lead sensor—which performs switching by the approach of said magnet—as a sensor 17.

Figure 5:
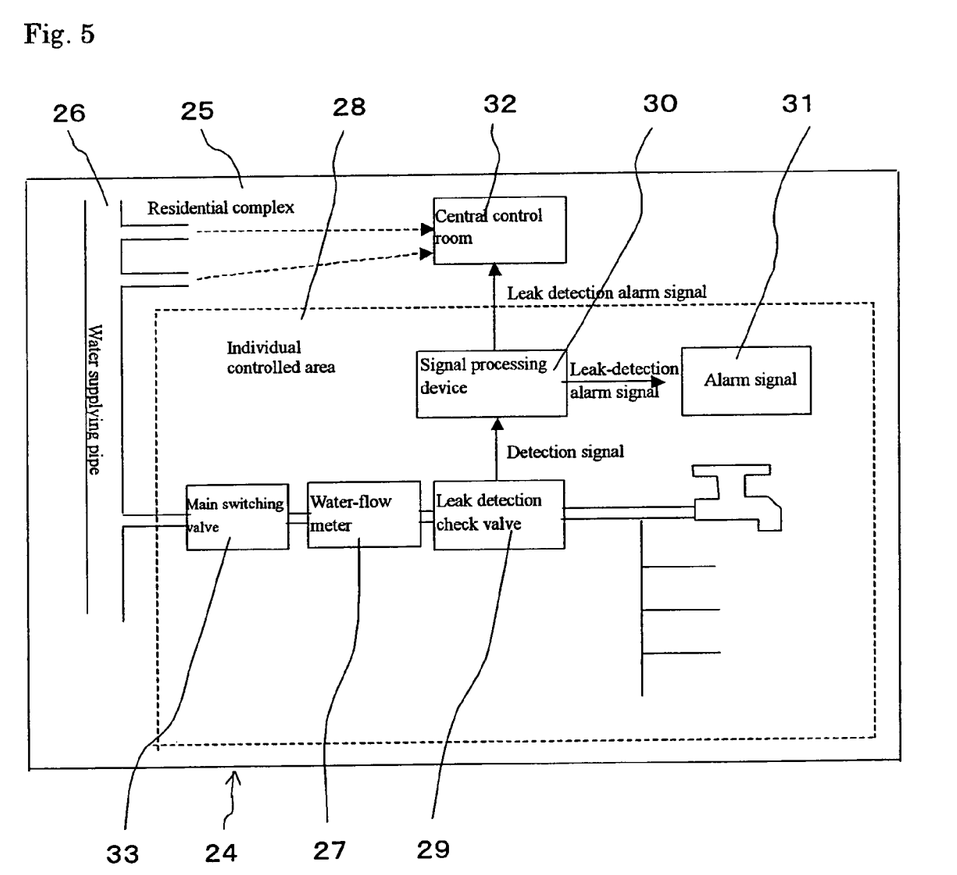
FIG. 5 is a block diagram showing the leak-detection alarm system of the present invention.
Figure 6:
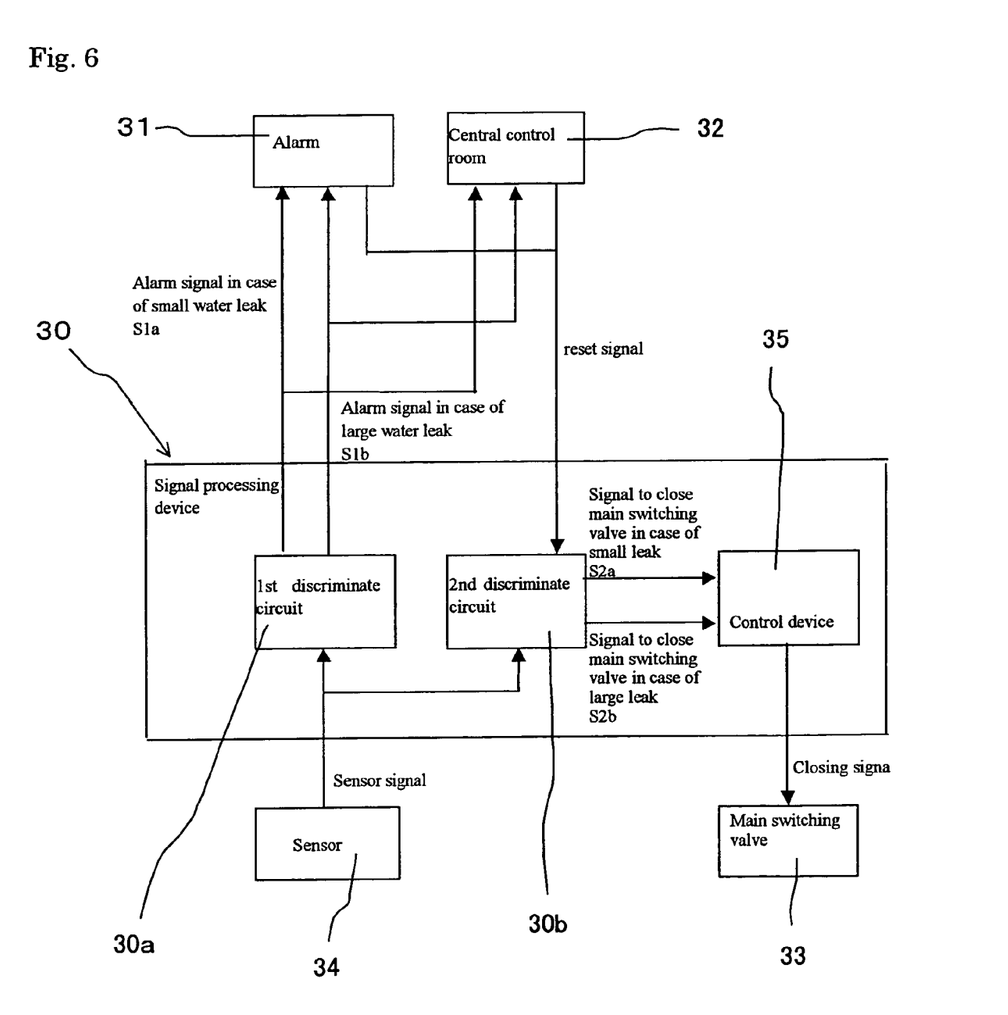
FIG. 6 is a diagram showing the flow of signals of the leak-detection alarm system.

FIG. 5 schematically shows the structure of the leak-detection alarm system 24 that uses the leak-detecting check valve of this invention, and FIG. 6 shows the flow of signals of leak-detection alarm system 24. In FIG. 5, a signal-processing device 30, which processes detection signals from the sensor in the leak-detecting check valve 29, is equipped in combination with the leak-detecting check valve 29. The signal-processing device 30, as shown in FIG. 6, is equipped with both a first discriminate circuit 30a, which detects the opening/closing of the main valve or the ancillary valve, and a second discriminate circuit 30b, which measures the duration of the opening/closing of the main valve or the ancillary valve, with the respective action being done by each valve in response to detection signals transmitted from the sensor 34. In addition, the signal-processing device 30 is constituted such that it generates leak-detection alarm signals S1a and S1b the opening/closing control signals S2a, S2b, by processing the data of the discriminate circuit 30a and 30b.

In addition, the signal-processing device 30 is constituted such that it actuates an alarm-signal device 31 in response to leak-detection alarm signals S1a and S1b, and it is equipped with a control device 35, which in response to opening/closing control signals S2a and S2b, opens/closes the main switching valve 33, which is located on the water-inlet side of the leak-detecting check valve 29. Moreover, leak-detection alarm signals are delivered not only to the alarm-signal device 31 but also to a central control room 32 (where a person is present) of a residential complex 25 and the like, so that a leak can be immediately responded to and dealt with.

Thus, if water is not flowing, as is the condition reflected by FIG. 1—more specifically, if the pressure of the water-inlet-side area B is equal to that of the water-outlet-side area C—then (1) the main valve 6 comes into contact with the valve sheet 5 due to the elastic force of both the main-valve spring 7 and the ancillary-valve spring 10; (2) the ancillary valve 9 comes into contact with the ancillary-valve sheet 8 due to the elastic force of the ancillary-valve spring 10; and (3) the water-outlet-side-section 11 of the main valve 6 comes into contact with the water-inlet-side end section 13 of the movable device 14.

Pressure in the area C gradually decreases when there is a small leak on the water-outlet side of the valves. If the difference in pressure at the water-inlet-side area B and water-outlet side area C exceeds the elastic force of the ancillary-valve spring 10, the ancillary valve 9 is pushed toward the water-outlet side, and the fluid channel A is opened slightly to allow circulation of the water, as is the condition reflected by FIG. 2 (reference number 19 indicates the direction of flow of the fluid), and the movable device 14 moves in conjunction with the ancillary valve 9 toward the water-outlet side and to a location where the sensor 17 can sense the movable device 14 (i.e., a corresponding location in the longitudinal direction of the fluid channel A).

Figure 2:
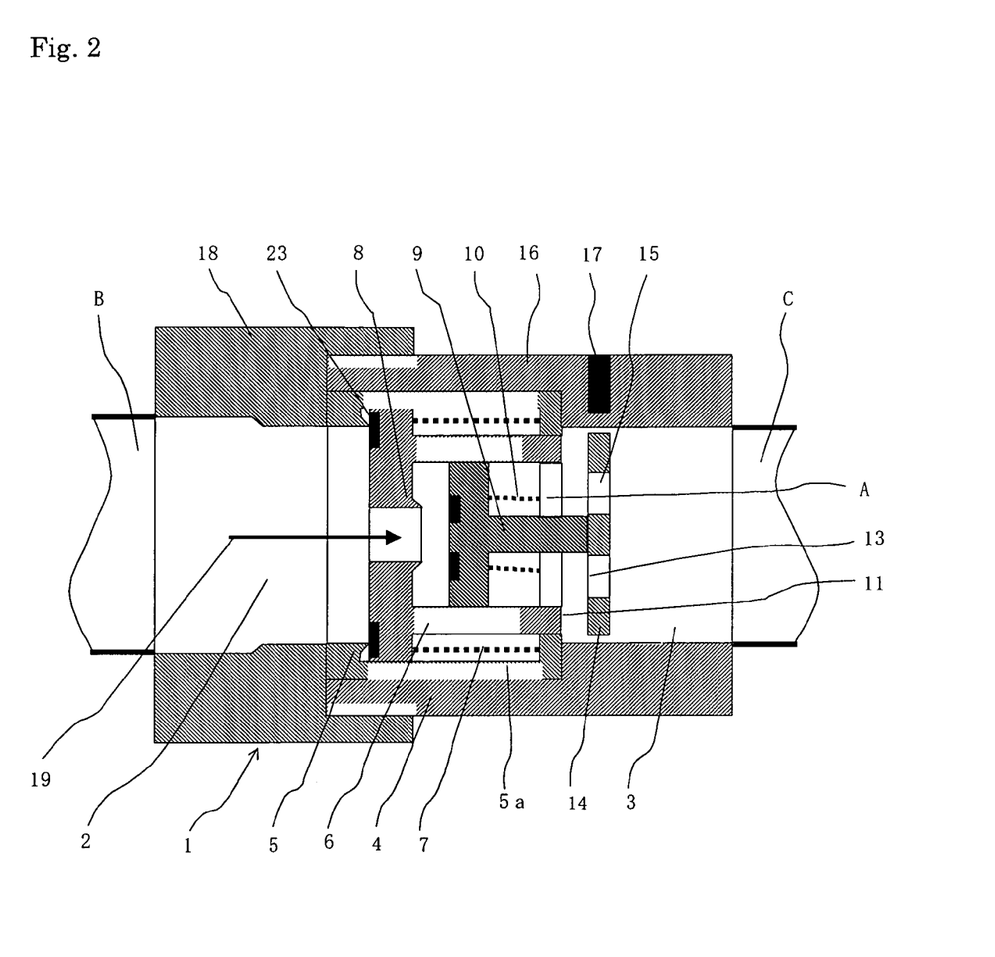
FIG. 2 is a cross-sectional view showing the leak-detection check valve of the present invention when there is a small flow of fluid.

When water is supplied from the water-inlet-side area B to the water-outlet-side area C through the fluid channel A due to the opening of the ancillary valve 9, the difference in pressure in the areas B and C rivals the elastic force of the ancillary-valve spring 10 in a comparatively short time in the case of a small leak. Then the ancillary valve 9 comes into contact with the ancillary-valve sheet 8 and the fluid channel A is closed. This movement of the ancillary valve is detected by the sensor 17 in the form of a pulse signal of a constant, fixed length that is received by a first discriminate circuit 30a.

Here, a pulse signal and the pulse-signal width are detected. If the above-mentioned leak continues, when the next pulse signal is received within a required reset time that is prescribed to be at a longer interval than said pulse-signal width, a counter calculates the number of pulse signals. If the numbers of pulse signals exceeds a predetermined value, an alarm signal S1a indicating a water leak is transmitted to the alarm-signal device 31. (This is a case of a naturally occurring small water leak or a human-caused water leak caused by insufficient closing of a faucet or the like.) If such a signal continues for a long time after the above-mentioned alarm call, the second discriminate circuit 30b transmits a opening/closing control signal S2a—within a predetermined period of time—to the control device 35 so that an operation to close the main switching valve 33 will be performed. In fact, at the stage where alarm signals are recognized in the central control room 32 and the like, and the presence/absence of an error is determined, there is emitted either an operational signal to open the main switching valve 33 or a reset signal to reset the aforementioned counter.

If there is a rather large water leak at the water-outlet-side area C, the pressure at the line C decreases rapidly, and the difference in pressure in areas B and C is not eliminated only by the opening of ancillary valve 9. More specifically, under the condition that the flow of the fluid is increased and the difference of pressure between the water-inlet side and water-outlet side of the ancillary valve 9 is constantly larger than the pressure of the ancillary-valve spring 10, which always elastically energizes the ancillary valve 9 against the ancillary-valve sheet 8, the ancillary valve 9 remains open. In this case, because the difference of pressure at the water-inlet-side area B and that at the water-outlet-side area C exceeds the synthetic elastic force of the main-valve spring 7 and that of the ancillary-valve spring 10, as is reflected by FIG. 3, the main valve 6 is pushed toward the water-outlet side, fluid channel A is opened to a large extent so as to allow circulation of the fluid (reference number 20 indicates the direction of flow of the fluid), and, due to the movement of the main valve 6, the movable device 14 moves toward the water-outlet side to a location where the sensor 17 can sense the movable device 14. (i.e., the corresponding location in the longitudinal direction of the fluid channel A).

Figure 3:
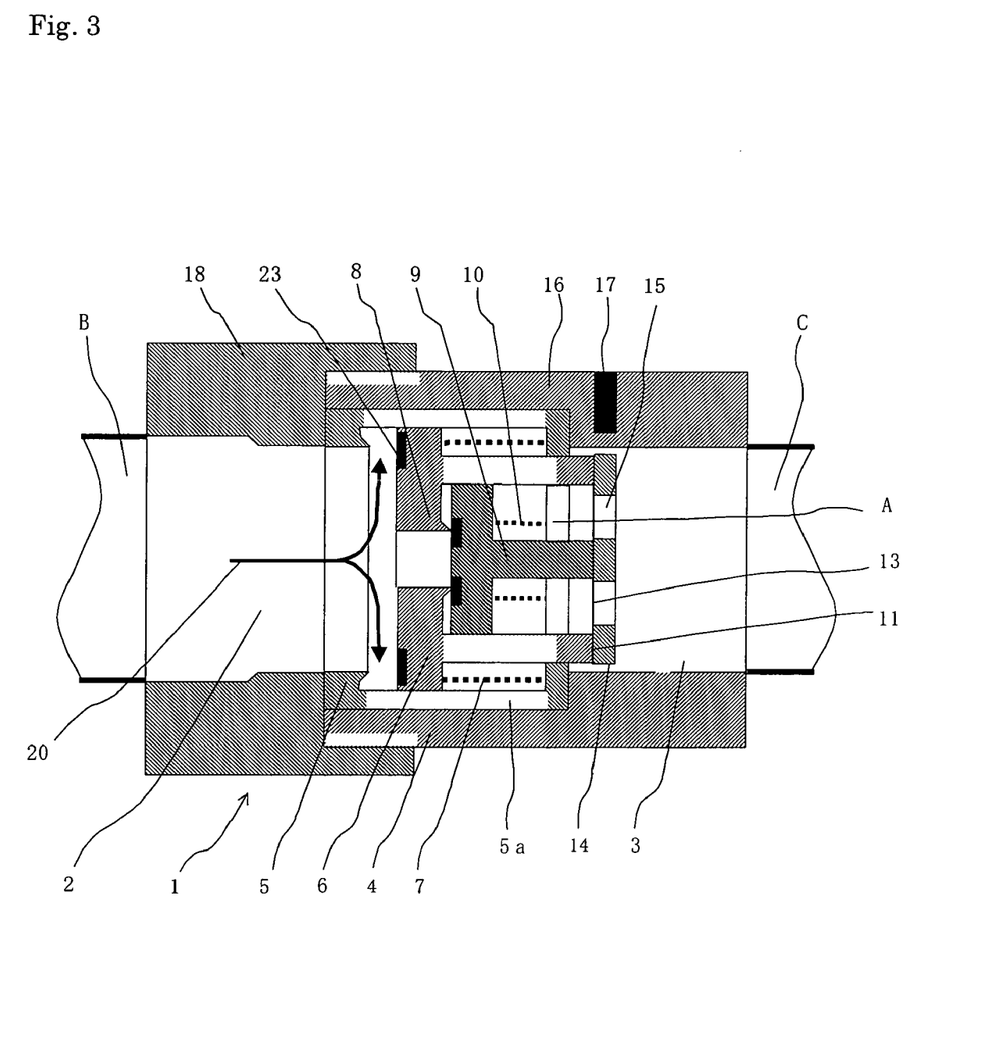
FIG. 3 is a cross-sectional view showing the leak-detection check valve of the present invention when there is a large flow of fluid.

When water is supplied from the water-inlet-side area B to the water-outlet-side area C through the running-water channel A by the opening of the main valve 6, the differential pressure between the areas B and C rivals the elastic force of the main-valve spring 7 and that of the ancillary-valve spring 10, and the main valve 6 contacts the main-valve sheet 5 and is closed, taking a much longer time to do so than the above-mentioned time, although, in case of a very large leak, how much time will be necessary for the closing will depend on the size of the leak. This movement of the main valve is detected by the sensor 17 in the form of pulse signals, and transmitted to first discriminate circuit 30a.

Here, a pulse signal and the pulse-signal width are detected. If the above leak continues, when the next pulse signal is received within a prescribed reset time that is a longer interval than said pulse-signal width, a counter calculates the number of pulse signals. If the number of pulse signals exceeds a predetermined value, a leak-detection alarm signal S1b is sent to the alarm-signal device 31 (The leak-detection alarm signal S1b is sent in case of a large, naturally occurring water leak or an artificial water leak resulting because some person forgot to close a faucet.) In second discriminate circuit 30b, if these signals continues for a long time after the above alarm call, leak-detection alarm signals S2b are sent at prescribed intervals to the control device 35 so that an operation to close the main switching valve 33 will be performed. In fact, at the stage where alarm signals are recognized in the central control room and the like, and the presence/absence of an error is determined, there is emitted either a resetting signal to reset said counter or an operational signal to open the main switching valve 33.

As described above, the leak-detecting check valve of this invention can transmit pulse signals in response to naturally occurring and human-caused water leaks. In addition, the leak-detection alarm system can transmit alarm signals that indicate the degree of a water leak according to whether the leak is small or large, and it can also automatically stop water leaks by such a means as closing the main switching valve 33 in case of an emergency.

Furthermore, as described in FIGS. 2 and 3, the present invention's leak-detecting check valve 1 has an ancillary valve 9 that is opened if the flow of fluid is small and a main valve 6 that is opened if the flow of fluid is large. The operating mode of these valves changes from a pulse-like opening and closing at intervals to being constantly open, according to the rate at which the fluid is flowing. However, the fluid-flow rate at which the main valve should be opened, or at which the operating mode should be changed from pulse switching to continuously open, can be set to a predetermined value by adjusting the spring constants of the main-valve spring 7 and the ancillary-valve spring 10 and by adjusting the opening areas of the fluid routes 19 and 20. However, if a very low rate of flow needs to be detected, the fluid opening area of the fluid route 19 when the ancillary valve 9 is open must be much smaller than that of the fluid route 20 when the main valve 6 is open.

Figure 4:
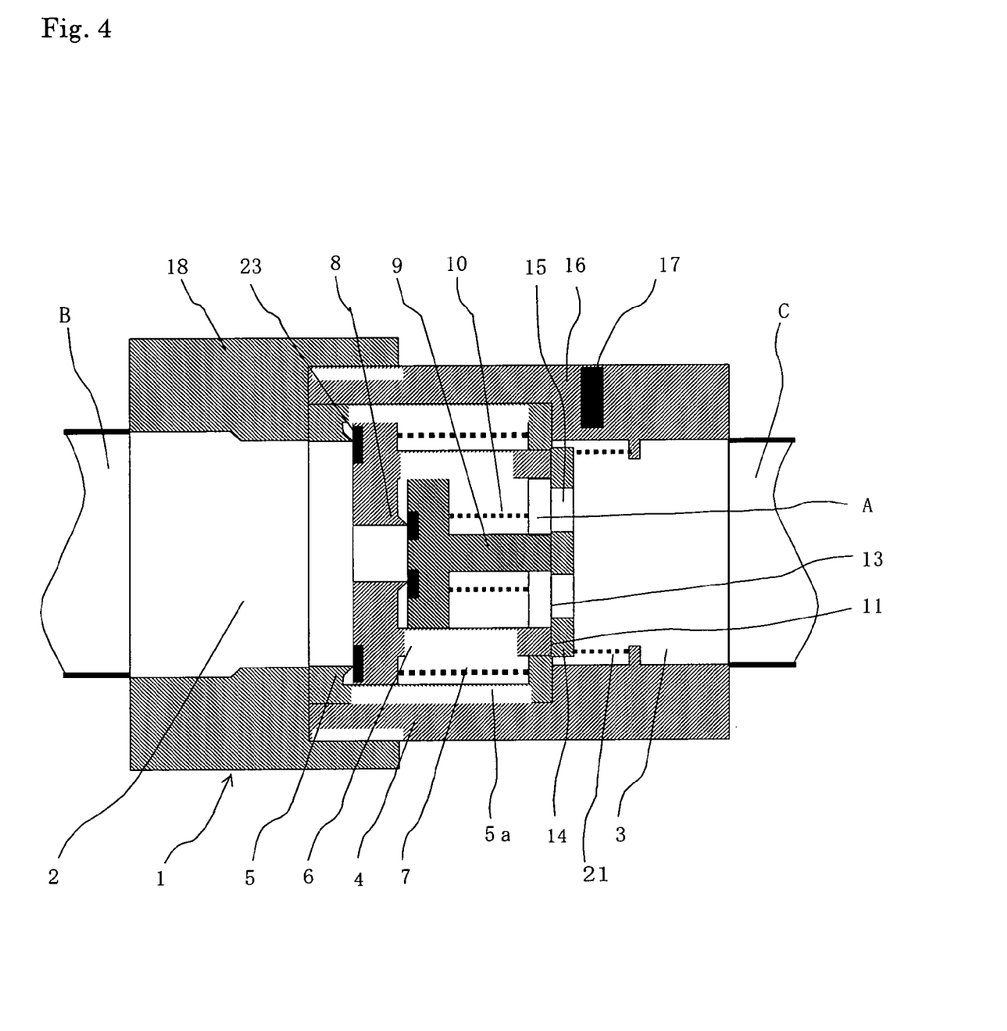
FIG. 4 is a cross-sectional view of another embodiment of the leak-detection check valve of the present invention.

FIG. 4 is a cross-sectional view that shows another embodiment relating to the leak-detecting check valve 1, which is a component of the leak-detection alarm system of the present invention. FIG. 4 shows the condition when the leak-detecting check valve 1 is closed and the fluid is not flowing. Only the part that is different from FIG. 1 will be described here. In FIG. 1, because the movable device 14 is formed integrally with the ancillary valve 9, the movable device 14 indirectly receives the elastic force from the ancillary-valve spring 10 via the ancillary valve 9, whereby the movable device 14 is given an impetus toward the water-outlet side and against the valve casing 4. In contrast, however, in the embodiment of FIG. 4, the movable device 14 is separated from the ancillary valve 9, and the movable device spring 21 elastically energizes the movable device 14 toward the water-inlet side and against the valve casing 4.

As already described, FIG. 5 illustrates the leak-detection alarm system 24 in relation to the plumbing system in a residential complex 25. In such a situation, running water is supplied via a water-supplying pipe 26, via a water meter 27, to an individually controlled area 28 (each household). A leak-detecting check valve 29 is inserted on water-supplying side of the water meter 27, and running water for each water-using device is supplied from the water-supply side of the leak-detecting check valve 29. The flow of running water in an individually controlled area 28 is always detected by a sensor 17 of a leak-detecting check valve 29 as the opening/closing of a main valve or an ancillary valve, and sensor signals regarding such opening/closing are transmitted to a signal-processing device 30. The signal-processing device 30 analyzes the signals emitted from the leak-detecting check valve 29, and if it determines that there might be a leak, it actuates an alarm-signal device 31 and transmits that signal to a central control room 32. In this preferred embodiment, the signal-processing device 30 is built in an individually controlled area 28, but it can be built in the central control room 32 instead.

What is claimed is:
1. A leak-detecting check valve that is characterized by being equipped with
 a valve casing that sets the circumference of a cylindrically shaped fluid channel;
 a main-valve sheet that is installed inside said valve casing;
 a main valve that has a large fluid-channel opening and that is equipped at its center with an ancillary-valve sheet, and that also is elastically energized toward the water-inlet side of said fluid channel and against said main-valve sheet by a main-valve spring;
 an ancillary valve that has a narrow fluid-channel opening, and that is elastically energized toward the water-inlet side of said fluid channel and against said ancillary-valve sheet by an ancillary-valve spring;
 a movable device that is installed nearer to the water-outlet side of said fluid channel than are said main valve and said ancillary valve, and moves in said fluid channel in conjunction with the movement of said main valve or said ancillary valve, as is the case; and
 a sensor that is implanted inside a valve casing on the water-outlet side of said fluid channel such that said sensor faces said fluid channel, so that said sensor senses said movable device when it moves to a speci- fied location, thereby entering an area where sensing is possible, and transmits valve-movement-detection signals.

2. A leak-detecting check valve described in claim 1, wherein said valve casing is composed of a water-inlet side casing member that is linked to the water-inlet side of the pipe and that is equipped with said main valve sheet, and a water-outlet side casing member that is linked to the water-outlet side of the pipe, stores said main valve, said ancillary valve, and said movable device, and is equipped with a sensor, which is installed so as to face said fluid channel, and both of said casing members are linked to each other.

3. A leak-detecting check valve described in claim 1, wherein said ancillary-valve spring is constituted such that it elastically energizes said ancillary valve sheet toward the water-inlet side via said movable device.

4. A leak-detecting check valve described in claim 1, wherein said sensor is composed of a proximity switch that performs switching in response to the approach of said movable device.

5. A leak-detection alarm system that uses said leak-detecting check valve described in claim 1, and is equipped with a signal-processing device that processes detection signals from the sensor of said leak-detecting check valve, wherein said signal-processing device is equipped with a first discriminate circuit, which detects the opening/closing of said main valve or said ancillary valve, and a second discriminate circuit, which measures the duration of the opening/closing of said main valve or said ancillary valve, generating leak-detection alarm signals that result from the functioning of said discriminate circuits.

6. A leak-detection alarm system described in claim 5, wherein said leak-detection alarm system is constituted such that said leak-detection alarm signals actuate said leak-detection alarm system.

7. A leak-detection alarm system described in claim 5, wherein said leak-detection alarm system is equipped with a control device that opens/closes a main switching valve that is located on the water-inlet side of said leak-detecting check valve.

* * * * *

UNITED STATES PATENT AND TRADEMARK OFFICE
CERTIFICATE OF CORRECTION

| | | |
|---|---|---|
| PATENT NO. | : 7,114,516 B2 | Page 1 of 1 |
| APPLICATION NO. | : 10/683264 | |
| DATED | : October 3, 2006 | |
| INVENTOR(S) | : Nobuo Ito | |

It is certified that error appears in the above-identified patent and that said Letters Patent is hereby corrected as shown below:

Title Page,
Please add the following information to the above US Patent:

(30) Foreign application priority data

October 15, 2002................................... (JP) Application No. 2002-300672

Signed and Sealed this

Thirteenth Day of February, 2007

JON W. DUDAS
*Director of the United States Patent and Trademark Office*